Oct. 20, 1959

A. WALTER 2,909,733

HYBRID CIRCUIT ARRANGEMENT

Filed Oct. 29, 1956

INVENTOR.
Arthur Walter
BY
Michael S. Striker
Agt.

2,909,733

HYBRID CIRCUIT ARRANGEMENT

Arthur Walter, Konstanz/Bodensee, Germany, assignor to Firma Pintsch Electro G.m.b.H., Konstanz am Bodensee, Germany Application October 29, 1956, Serial No. 618,997

10 Claims. (Cl. 333—11)

The present invention relates to a hybrid circuit arrangement. More particularly, the present invention relates to a hybrid circuit arrangement having three pairs of terminals, each of which has the same characteristic impedance.

Hybrid circuit arrangements are used in various types of transmission apparatus. For example, hybrid circuits are used in telephone repeater circuits wherein it is necessary to use one piece of apparatus, such as an amplifier, in a transmission line which carries telephone conversations in two different directions. The hybrid circuit is used to prevent the output of the amplifier from being fed back into the input thereof thereby to cause oscillation.

In conventional hybrid circuit arrangements a differential transformer is used having three windings. The terminals of the hybrid circuit are connected to respectively different windings of the differential transformer. With such conventional hybrid circuit arrangements, it is necessary to use an additional transformer between the differential transformer and one of the pairs of output terminals to provide proper matching impedances for all three of the pairs of terminals of the hybrid circuit arrangement.

It is clear that the use of such an additional transformer for impedance matching purposes increases the physical size of the hybrid circuit apparatus by a great amount and also increases the cost of fabrication of such a circuit.

The present invention provides a hybrid circuit arrangement having three pairs of terminals, the characteristic impedance between each of the pairs of terminals being equal. This is accomplished without the use of any additional transformer.

Accordingly, it is an object of the present invention to overcome the disadvantages of the conventional arrangements described hereinabove.

A second object of the present invention is to provide a new and improved hybrid circuit arrangement.

Another object of the present invention is to provide a new and improved hybrid circuit arrangement having at least three pairs of terminals, the characteristic impedance between each pair of the terminals being equal and wherein the hybrid circuit arrangement uses only one transformer.

A further object of the present invention is to provide a hybrid circuit arrangement using an impedance network to provide characteristic impedances between each of the pairs of terminals of a hybrid circuit arrangement.

Still another object of the present invention is to provide a hybrid circuit arrangement wherein an asymmetrical quadripole is used for properly equalizing the characteristic impedances of each of the terminals of the hybrid circuit arrangement.

With the above objects in view the present invention mainly consists of a hybrid circuit arrangement having three pairs of terminals and including a transformer having at least one primary winding and one secondary winding, the ends of the secondary winding being connected respectively to one of the pairs of terminals and being terminated by a characteristic impedance Z, the primary winding having a center tap, a two-terminal balancing network having one terminal thereof connected to one end of the primary winding and having an impedance 2Z, the second pair of the hybrid terminals being connected respectively to the other terminal of the balancing network and the center tap of the primary winding, the transformation ratio between said primary and secondary windings being selected in such a manner that a matching impedance 2Z is thereby determined between said other terminal of said balancing network and the other end of said primary winding, as well as across said balancing network, and an asymmetrical quadripole having an input image impedance equal to Z having an output impedance equal to 2Z, the output of the quadripole being connected between the other terminal of the balancing network and the other end of the primary winding, the input of the quadripole being connected to the third pair of terminals of the hybrid circuit whereby each of the pairs of terminals of the hybrid circuit arrangement has an impedance equal to Z.

In still another embodiment of the present invention the transformer has an additional center tapped primary winding so that the entire hybrid circuit is completely balanced with respect to ground.

The novel features which are considered as characteristic for the invention are set forth in particular in the appended claims. The invention itself, however, both as to its construction and its method of operation, together with additional objects and advantage thereof, will be best understood from the following description of specific embodiments when read in connection with the accompanying drawings, in which:

Figure 1:
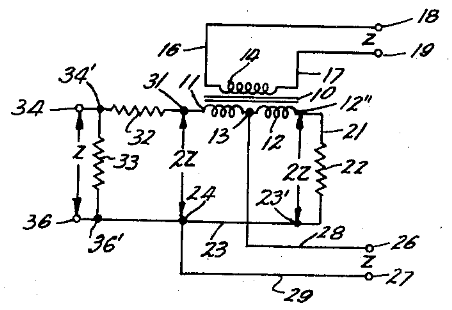
Fig. 1 is an electrical schematic diagram of one embodiment of the present invention.

Referring to the drawings, and more particularly to Fig. 1 it can be seen that the hybrid circuit arrangement incorporating the principles of the present invention includes a differential transformer 10 having balanced primary windings 11 and 12 connected in series with a center tap 13. The transformer 10 has a secondary winding 14.

Connected respectively to the ends of the secondary winding 14 by means of conductors 16 and 17 are a first pair of terminals 18 and 19 of the hybird circuit arrangement. The transformation ratio of transformer 10 is such that the characteristic impedance appearing across the secondary winding 14, between the first pair of terminals 18 and 19, equals the value Z, as will be explained below.

Connected to one end 12'' of the primary winding 12 by means of a conductor 21 is one terminal of a two-terminal balancing network 22. The other terminal 23' of the network 22 is connected by conductor 23 to a junction point 24. The second pair of terminals 26 and 27 of the hybrid circuit arrangement are respectively connected to the center tap 13 by conductor 28 and to the junction point 24 by means of conductor 29.

Connected to one end of the primary winding 11 of the differential transformer 10 is the junction point 31.

Now with conventional hybrid circuits, in contrast to the hybrid circuit according to the invention, junction points 31 and 24 respectively would be directly connected to the third pair of terminals of the hybrid circuit arrangement and be matched by an impedance which equals the value Z, the transformation ratio between secondary and primary windings being therefore chosen to establish the same impedance between terminals 18 and 19 as between junction points 31 and 24. Accordingly with such known hybrid circuits the two-terminal balancing network 22 mentioned above would also have to have an impedance equal to Z, the primary of the differential transformer being thus balanced with regard to the secondary winding and to the first pair of terminals connected thereto. As is well known, in this balanced state, no transmission nor any impedance transformation is possible from the first pair of terminals 18, 19 to any element connected between center tap 13 and junction point 24 and vice-versa, as intended. Therefore, between center tap 13 and junction point 24 appears an impedance which equals half the value of the impedance existing across junction points 31 and 24. In the conventional hybrid circuit, this means that an impedance of Z/2 appears between center tap 13 and junction point 24, necessitating the use of an additional transformer in order to provide for the second pairs of terminals the same value of characteristic impedance as is effective across junction points 31 and 24, that is the value Z.

Contrary to this conventional arrangement, with the hybrid circuit according to the invention the doctrine has been abandoned that the proper matching impedance between junction points 31 and 24 has to be equal to the characteristic impedance appearing between the first pair of terminals 18 and 19 and the second pair of terminals 26 and 27, respectively.

In the hybrid circuit arrangement according to Fig. 1, as stated above, the transformation ratio of transformer 10 is chosen so that the characteristic impedance appearing across its secondary winding 14, i.e. between the first pair of terminals 18 and 19, has only half the value of the matching impedance required between junction points 31 and 24. The latter as well as the impedance of the two-terminal balancing network 22 equals the value 2Z, whereby the value of Z is obtained for the impedance between the first pairs of terminals 18 and 19.

The value of the impedance appearing between center tap 13 and junction point 24, which equals half the value of the impedance effective between junction points 31 and 24, will now be equal to Z, which is the intended characteristic impedance for the second pair of terminals 26 and 27.

Also connected to the junction points 24 and 31 is the output of an asymmetrical quadripole made up of the resistors 32 and 33 and having terminals at 31, 24, 34′, 36′. The third pair of terminals 34 and 36 of the hybrid circuit arrangement are connected to the opposite ends 34′, 36′ respectively, of the resistor 33 representing the input of the quadripole.

The values of the elements of the quadripole are arranged so that the input image impedance between the terminals 34 and 36 equals Z and the input image impedance across the output junction points 24 and 31 of the quadripole matches the characteristic impedance 2Z existing across the points 24 and 31. These values can be established from the following relationships:

$$Z_{32}+\frac{(Z_{33})(Z)}{Z_{33}+Z}=2Z \quad (1)$$

and $$\frac{Z_{33}(Z_{32}+2Z)}{Z_{33}+Z_{32}+2Z}=Z \quad (2)$$

wherein $Z_{32}$ and $Z_{33}$ are the impedance values of the elements 32, 33, respectively.

Accordingly, the above-described arrangement of Fig. 1 provides a hybrid circuit arrangement having three pairs of terminals 18, 19; 26, 27; and 34, 36. The characteristic impedance across each of these pairs of terminals has the value Z. The quadripole has the output image impedance value 2Z which matches the characteristic impedance 2Z across the junction points 24 and 31.

This arrangement permits the transfer from a two-wire transmission system to a four-wire transmission system and vice versa. In addition, the equal characteristic impedance Z is obtained at each of the pairs of output terminals even though the impedance appearing across the secondary winding 14 of the differential transformer 10 is equal to one half of the matching impedance across the junction points 24 and 31. This is a further distinction between the hybrid circuit arrangement of the present invention and conventional circuit arrangements wherein the impedance at the terminals of the secondary winding is equal to the impedance at the terminals of the primary winding which, by comparison, correspond to the above mentioned junction points 24, 31.

The arrangement of Fig. 1 provides an additional advantage in that the complex impedance of the transmission line looking into the terminals 34 and 36 is made more uniform due to the use of the quadripole. This facilitates balancing of the line. In addition, in a balancing network 22 made solely from one or more resistors and capacitors respectively, any capacitors that are used can be smaller than in the conventional hybrid circuit arrangements.

Figure 2:
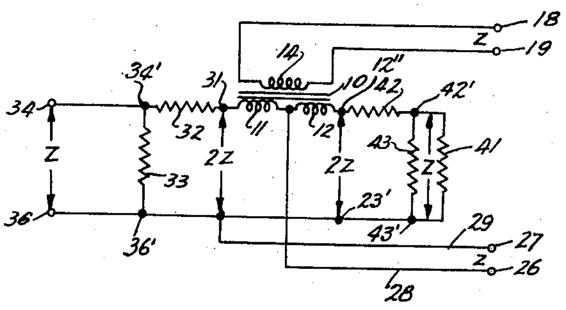
Fig. 2 is an electrical schematic diagram of a second embodiment of the present invention.

Referring now to Fig. 2 a second embodiment of the present invention will be described. The parts of Fig. 2 which have the same function as the parts of Fig. 1 have the same reference numerals. In this embodiment in place of the balancing network 22, a balancing network is provided which comprises a balancing network having an impedance equal to Z. The impedance of the balancing network 41 accordingly corresponds to the usual value for balancing networks in conventional hybrid circuit arrangements. To properly match the impedances in this arrangement, a second quadripole having terminals at 42′, 43′, 12″, 23′ and made up of the resistors 42 and 43 is connected at 12″ with the primary winding 12 of the differential transformer 10 and at 42′ and 43′ with the impedance 41, said second quadripole corresponding to the quadripole 32, 33. In this manner, if conventional balancing networks as shown at 41 are more easily commercially available, it would be possible to use the same with the improved circuit of the present invention.

In addition to the above advantages, the use of the second quadripole having an input impedance equal to Z and an output impedance equal to 2Z permits a more proper balancing of the hybrid circuit arrangement. Therefore, a higher precision can be attained thereby improving the transmission coefficients between the terminal pairs 18, 19 and 26, 27.

Figure 3:
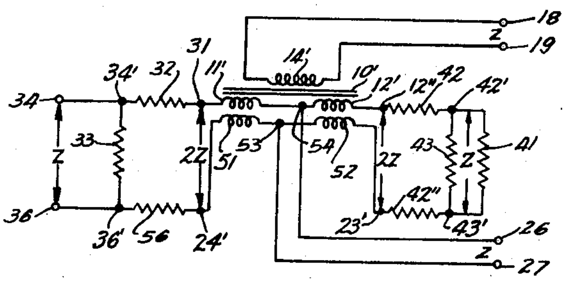
Fig. 3 is an electrical schematic diagram of still another embodiment of the present invention.

Referring now to Fig. 3, still another embodiment of the present invention is illustrated. This arrangement provides a balanced arrangement of the differential transformer and the quadripole with respect to ground. In the embodiment of Fig. 3, the differential transformer 10′ has a secondary winding 14′, a pair of primary windings 11′, 12′ with a center tap 54 and another pair of primary windings 51 and 52 with a center tap 53 therebetween. The pair of terminals 26 and 27 are connected between this center tap 53 and the center tap 54 of the windings 12′ and 11′, respectively.

In this embodiment the quadripole with terminals 31, 24′, 36′, 34′ still has an input image impedance equal to Z and an output image impedance equal to 2Z. However, the quadripole comprises not only resistors 32, 33, but an additional resistor 56. The impedances of the quadripole are obtained from the following equations:

$$Z_{32}+\frac{(Z_{33})(Z)}{(Z_{33}+Z)}+Z_{56}=2Z \quad (3)$$

$$\frac{(Z_{33})(Z_{32}+2Z+Z_{56})}{Z_{33}+Z_{32}+2Z+Z_{56}}=Z \quad (4)$$

and $$Z_{32}=Z_{56} \quad (5)$$

wherein $Z_{32}$, $Z_{33}$, $Z_{56}$ are the impedance values of the elements 32, 33, 56, respectively.

The second quadripole forming part of the balancing network and having the four terminals at 12″, 23′, 43′, 42′ is also composed mainly of three elements 42, 42″, 43 corresponding to the quadripole comprising the resistors 32, 33, 56, and connected at 42′, 43′ with an impedance 41 similar to the arrangement of Fig. 2.

In the arrangement illustrated in Fig. 3, the proper characteristic impedance is obtained at each of the three pairs of terminals of the hybrid circuit arrangement. However, the arrangement is completely balanced with respect to ground so that undesirable ground currents between different grounded parts of the circuit can be eliminated if these are large enough to be undesirable.

A further advantage of the present invention is that the quadripole inserted to provide the proper impedance matching for the hybrid circuit introduces attenuation which is usually required in the transmission line to keep the level of the transmitted signals within prescribed limits. This usually has to be provided by means of attenuation pads in each of the lines of the transmission circuit. Therefore, the use of the quadripole eliminates, if desired, the necessity for any additional attenuating elements.

It is therefore apparent that with the described circuit incorporating the principles of the present invention, a hybrid circuit arrangement is obtained having three pairs of terminals, the characteristic impedances between each of them being equal. This characteristic impedance is achieved without the necessity of having more than one transformer in the circuit.

It will be understood that each of the elements described above, or two or more together, may also find a useful application in other types of circuit arrangements differing from the types described above.

While the invention has been illustrated and described as embodied in hybrid circuit arrangements using an asymmetrical quadripole, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A hybrid circuit arrangement having three pairs of terminals, comprising, in combination, a differential transformer having at least one center-tapped primary winding and a secondary winding, the ends of said secondary winding being connected respectively to one of said pairs of terminals, said secondary winding being terminated by a characteristic impedance Z; a two-terminal balancing network having one terminal thereof connected to one end of said primary winding and having an impedance 2Z, the second pair of said hybrid circuit terminals being connected respectively to the other terminal of said balancing network and said center tap of said primary winding, the transformation ratio between said primary and secondary windings being selected in such a manner that a matching impedance 2Z is thereby determined between said other terminal of said balancing network and the other end of said primary winding, as well as across said balancing network; and an asymmetrical quadripole having an input image impedance equal to Z and an output image impedance equal to 2Z, the output terminals of said quadripole being connected between said other terminal of said balancing network and said other end of said primary winding, the input terminals of said quadripole being connected to the third pair of terminals of said hybrid circuit whereby each of said pairs of terminals of said hybrid circuit arrangement has an impedance equal to Z.

2. A hybrid circuit arrangement balanced with respect to ground and having three pairs of terminals comprising, in combination, a differential transformer having two center-tapped primary windings and one secondary winding which is terminated by a characteristic impedance Z, the ends of said secondary winding being connected respectively to one of said pairs of terminals; a two-terminal balancing network having an impedance 2Z, one terminal thereof being connected to one end of the first of said primary windings and the other terminal thereof connected to one end of the second of said primary windings, the second pair of said hybrid circuit terminals being connected respectively to the center taps of said first and second primary windings, the transformation ratio between both said primary windings and said secondary windings being selected in such a manner that a matching impedance 2Z is thereby determined between the said other ends of said first and second primary windings, as well as across said balancing network; and an asymmetrical quadripole having an input image impedance equal to Z and an output image impedance equal to 2Z, the output terminals of said quadripole being connected between said other ends of said first and second primary windings, the input terminals of said quadripole being connected to the third pair of terminals of said hybrid circuit whereby each of said pairs of terminals of said hybrid circuit arrangement has an impedance equal to Z.

3. Apparatus as claimed in claim 1 wherein said quadripole includes two impedances having the values $Z_{32}$ and $Z_{33}$, respectively, said impedance values satisfying the following two equations:

$$Z_{32}+\frac{(Z_{33})(Z)}{Z_{33}+Z}=2Z$$

and $$\frac{Z_{33}(Z_{32}+2Z)}{Z_{33}+Z_{32}+2Z}=Z$$

4. Apparatus as claimed in claim 2 wherein said quadripole includes three impedances having the values $Z_{32}$, $Z_{33}$ and $Z_{56}$, respectively, said impedance values satisfying the following three equations:

$$Z_{32}+\frac{(Z_{33})(Z)}{(Z_{33}+Z)}+Z_{56}=2Z$$

$$\frac{(Z_{33})(Z_{32}+2Z+Z_{56})}{Z_{33}+Z_{32}+2Z+Z_{56}}=Z$$

and $$Z_{32}=Z_{56}$$

5. An arrangement as claimed in claim 1, wherein said two-terminal balancing network having an impedance 2Z comprises a two-terminal balancing network having an impedance Z and a second asymmetrical quadripole the input image impedance of which is equal to Z and the output image impedance of which is equal to 2Z, the input terminals of said second quadripole being connected to the terminals of said balancing network having an impedance Z, the output terminals of said quadripole forming the two terminals of said two-terminal balancing network having an impedance 2Z.

6. An arrangement as claimed in claim 5, wherein said asymmetrical quadripoles are substantially composed of resistors.

7. An arrangement as claimed in claim 1, wherein said asymmetrical quadripole is substantially composed of resistors only.

8. An arrangement as claimed in claim 2, wherein said two-terminal balancing network having an impedance 2Z comprises a two-terminal balancing network having an impedance Z and a second asymmetrical quadripole the input image impedance of which is equal to Z and the output image impedance of which is equal to 2Z, the input terminals of said second quadripole being connected to the terminals of said balancing network having an impedance Z, the output terminals of said quadripole forming the two terminals of said two-terminal balancing network having an impedance 2Z.

9. An arrangement as claimed in claim 8, wherein said asymmetrical quadripoles are substantially composed of resistors.

10. An arrangement as claimed in claim 2, wherein said asymmetrical quadripole is substantially composed of resistors only.

References Cited in the file of this patent

FOREIGN PATENTS

| | | |
|---|---|---|
| 195,273 | Great Britain | Mar. 29, 1923 |
| 199,344 | Great Britain | Apr. 3, 1924 |